US012645854B2

(12) United States Patent
Barker

(10) Patent No.: US 12,645,854 B2
(45) Date of Patent: Jun. 2, 2026

(54) VARIATION AWARE ADJUSTMENTS TO SUPERCONDUCTING ELECTRONIC CIRCUIT DESIGNS

(71) Applicant: Synopsys, Inc., Mountain View, CA (US)

(72) Inventor: Aaron John Barker, Broomfield, CO (US)

(73) Assignee: Synopsys, Inc., Sunnyvale, CA (US)

( * ) Notice: Subject to any disclaimer, the term of this patent is extended or adjusted under 35 U.S.C. 154(b) by 693 days.

(21) Appl. No.: 18/113,582

(22) Filed: Feb. 23, 2023

(65) Prior Publication Data

US 2024/0289524 A1 Aug. 29, 2024

(51) Int. Cl.
*G06F 30/3308* (2020.01)
*G06F 119/02* (2020.01)

(52) U.S. Cl.
CPC ...... *G06F 30/3308* (2020.01); *G06F 2119/02* (2020.01)

(58) Field of Classification Search
CPC .......... G06F 30/00; G06F 30/10; G06F 30/20; G06F 30/3308; G06F 30/367; G06F 30/27; G06F 30/28; G06F 9/30101; G06F 2119/06; G06F 2119/08; G06F 3/04883; G06F 11/302; G06F 9/45558; G06F 2009/45587; G06F 21/577; G06F 2221/034; G06F 21/602; G06N 10/60; G06N 10/00; G06N 10/40; G06N 10/80; G06N 10/70
USPC .................................................. 716/100–108
See application file for complete search history.

(56) References Cited

U.S. PATENT DOCUMENTS

| | | | |
|---|---|---|---|
| 9,633,150 B2 | 4/2017 | Barker | |
| 2020/0293937 A1* | 9/2020 | Babbush | G06N 10/40 |
| 2021/0119102 A1* | 4/2021 | Zhu | G01J 1/44 |
| 2022/0236108 A1* | 7/2022 | Perrenoud | G01J 5/20 |

OTHER PUBLICATIONS

S. Polonsky et al., "PSCAN'96: New software for simulation and optimization of complex RSFQ circuits," IEEE Trans. Appl. Supercond., vol. 7, No. 2, pp. 2685-2689, Jun. 1997.
PSCAN2. Pavel Shevchenko. Available: http://pscan2sim.org/.

(Continued)

*Primary Examiner* — Binh C Tat
(74) *Attorney, Agent, or Firm* — Patterson + Sheridan, LLP

(57) ABSTRACT

The present disclosure describes systems and methods for generating a superconducting electronic circuit design. The system includes a memory and a processor. The processor simulates a superconducting electronic circuit design using a first process variation to produce a first score and simulates the superconducting electronic circuit design using a second process variation to produce a second score. The processor, in response to determining that the first score is lower than the second score, simulates the superconducting electronic circuit design using the first process variation and a first design variation to produce a third score and simulates the superconducting electronic circuit design using the first process variation and a second design variation to produce a fourth score. The processor updates the superconducting electronic circuit design using the first process variation and the first design variation in response to determining that the third score is higher than the fourth score.

17 Claims, 7 Drawing Sheets

(56)     References Cited

OTHER PUBLICATIONS

G. E. P. Box and N. R. Draper in "Empirical Model Building and Response Surfaces," John Wiley and Sons, New York, 1987, p. 477.
Friedman, J. H. (1991). "Multivariate Adaptive Regression Splines". The Annals of Statistics. 19 (1): 1-67.
CRAN Package earth Available: https://cran.r-project.org/web/packages/earth/index.html.
Derringer, G. et al., (1980), "Simultaneous Optimization of Several Response Variables," Journal of Quality Technology, 12, 4, 214-219.
NIST/SEMATECH e-Handbook of Statistical Methods, http://www.itl.nist.gov/div898/handbook/, Apr. 2012.
Adams, B.M. et al., "Dakota, A Multilevel Parallel Object-Oriented Framework for Design Optimization, Parameter Estimation, Uncertainty Quantification, and Sensitivity Analysis: Version 6.15 User's Manual," Sandia Technical Report SAND2020-12495, Nov. 2021.
A. J. Barker, "Logic Verification of Superconducting Electronics Circuits, Including Margin Analysis of Yield", Patent Pending U.S. Appl. No. 17/962,345, filed Oct. 7, 2022—Synopsys Ref: 3918-US-01-PRV-PRI.

* cited by examiner

<u>400</u>

VARIATION AWARE ADJUSTMENTS TO SUPERCONDUCTING ELECTRONIC CIRCUIT DESIGNS

GOVERNMENT LICENSE RIGHTS

This invention was made with United States (U.S.) government support under Contract No. W911NF-17-9-0001 awarded by the Office of the Director of National Intelligence, Intelligence Advanced Research Projects Activity (IARPA), via the U.S. Army Research Office. The U.S. government has certain rights in the invention.

TECHNICAL FIELD

The present disclosure relates to an electronic design automation (EDA) system. In particular, the present disclosure relates to timing characterization of superconducting electronic circuit designs.

BACKGROUND

Superconducting electronic components or circuits may conduct electricity with zero resistance and expel magnetic flux (Meisner effect) when cooled below a critical temperature ($T_c$). For example, $T_c$ for Niobium may be around 9.7 Kelvin (K), and circuits that include Niobium may have a nominal operating temperature of 4.2K, which may be achieved through submersion into liquid helium. It may be challenging, however, to determine how to adjust superconducting electronic components or circuits to improve performance and yield.

SUMMARY

The present disclosure describes systems and methods for generating a superconducting electronic circuit design. According to an embodiment, the system includes a memory and a processor communicatively coupled to the memory. The processor simulates a superconducting electronic circuit design using a first process variation to produce a first score for the superconducting electronic circuit design and simulates the superconducting electronic circuit design using a second process variation to produce a second score for the superconducting electronic circuit design. The processor, in response to determining that the first score is lower than the second score, simulates the superconducting electronic circuit design using the first process variation and a first design variation to produce a third score for the superconducting electronic circuit design and simulates the superconducting electronic circuit design using the first process variation and a second design variation to produce a fourth score for the superconducting electronic circuit design. The processor updates the superconducting electronic circuit design using the first process variation and the first design variation in response to determining that the third score is higher than the fourth score. The processor may determine a condition that establishes whether the superconducting electronic circuit design passes or fails logic verification, simulate the superconducting electronic circuit design using a third process variation to produce a fifth score, and in response to the determining that the superconducting electronic circuit design with the third process variation fails logic verification according to the condition, purge the fifth score.

The first score may be determined according to a desirability function based on one or more of delay, power, and area.

The first design variation may be one or more of a size variation, a bias structure variation, a bias current variation, an external shunt resistor variation, and a storage inductor variation.

The processor may simulate the superconducting electronic circuit design using the first design variation and a third process variation to produce a fifth score for the superconducting electronic circuit design. Updating the superconducting electronic circuit design using the first design variation may be further based on the fifth score.

The first process variation may affect a thickness of a layer of the superconducting electronic circuit design.

According to another embodiment, the method includes simulating a superconducting electronic circuit design using a first process variation to produce a first score for the superconducting electronic circuit design and simulating the superconducting electronic circuit design using a second process variation to produce a second score for the superconducting electronic circuit design. The method also includes, in response to determining, by a processor, that the first score is lower than the second score, simulating the superconducting electronic circuit design using the first process variation and a first design variation to produce a third score for the superconducting electronic circuit design and simulating the superconducting electronic circuit design using the first process variation and a second design variation to produce a fourth score for the superconducting electronic circuit design. The method further includes updating the superconducting electronic circuit design using the first process variation and the first design variation in response to determining that the third score is higher than the fourth score.

The method may include determining a condition that establishes whether the superconducting electronic circuit design passes or fails logic verification, simulating the superconducting electronic circuit design using a third process variation to produce a fifth score, and in response to the determining that the superconducting electronic circuit design with the third process variation fails logic verification according to the condition, purging the fifth score.

The first score may be determined according to a desirability function based on one or more of delay, power, and area.

The first design variation may be one or more of a size variation, a bias structure variation, a bias current variation, an external shunt resistor variation, and a storage inductor variation.

The method may include simulating the superconducting electronic circuit design using the first design variation and a third process variation to produce a fifth score for the superconducting electronic circuit design. Updating the superconducting electronic circuit design using the first design variation may be further based on the fifth score.

The first process variation may affect a thickness of a layer of the superconducting electronic circuit design.

According to another embodiment, a non-transitory computer readable medium stores instructions for generating a superconducting electronic circuit design. When the instructions are executed by a processor, the processor simulates a superconducting electronic circuit design using a first plurality of process variations to produce a first set of scores for the superconducting electronic circuit design and determines a process variation of the first plurality of process variations that produced a lowest score from the first set of scores. The processor simulates the superconducting electronic circuit design using the determined process variation and a plurality of design variations to produce a second set of scores for the superconducting electronic circuit design, determines the design variation of the plurality of design variations that produced a highest score from the second set of scores, and updates the superconducting electronic circuit design using the determined process variation and the determined design variation.

The processor may determine a condition that establishes whether the superconducting electronic circuit design passes or fails logic verification and in response to determining that the superconducting electronic circuit design with a first process variation from the first plurality of process variations fails logic verification according to the condition, purge a score of the first set of scores produced by simulating the superconducting electronic circuit design with the first process variation.

The first set of scores may be determined according to a desirability function based on one or more of delay, power, and area.

The plurality of design variations may include one or more of a size variation, a bias structure variation, a bias current variation, an external shunt resistor variation, and a storage inductor variation.

The processor may simulate the superconducting electronic circuit design using the determined design variation and a second plurality of process variations to produce a third set of scores for the superconducting electronic circuit design. Updating the superconducting electronic circuit design using the determined design variation may be further based on the third set of scores.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
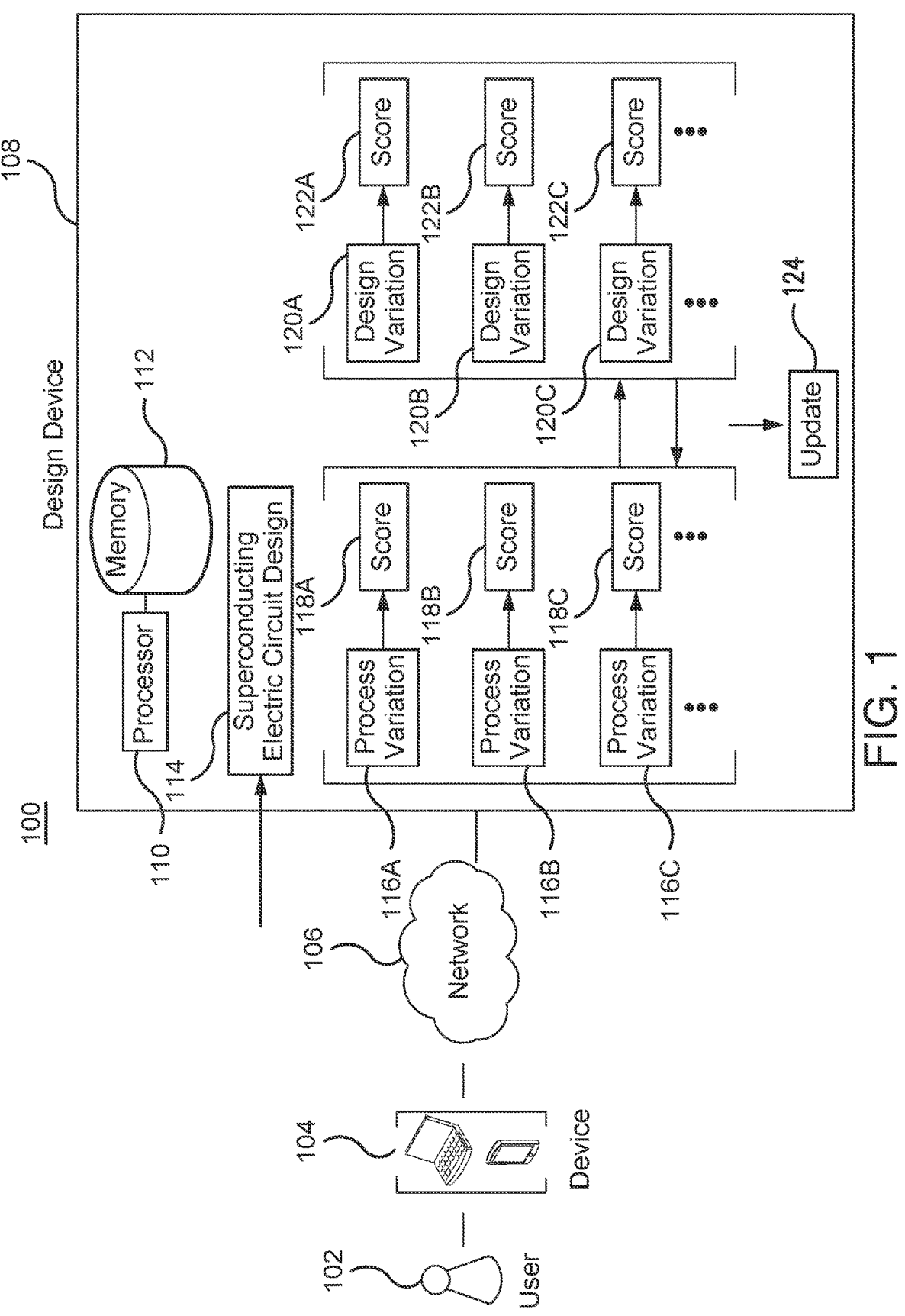
FIG. 1 illustrates an example system for adjusting a superconducting electronic circuit design.

Aspects of the present disclosure relate to variation aware adjustments to superconducting electronic circuit designs. Generally, it may be difficult to determine how to adjust a superconducting electronic circuit design to improve performance or yield because the superconducting electronic circuit design may fail too frequently at sample or simulation points. Stated differently, the superconducting electronic circuit design may be too fragile to undergo traditional simulation techniques.

The present disclosure describes a system and method that determines adjustments to a superconducting electronic circuit design that may improve yield and performance. Generally, the system simulates the superconducting electronic circuit design using different process variations and then selects the process variation that causes the superconducting electronic circuit design to perform the worst (e.g., have a worst combination of power usage, delay, and area according to a predefined desirability function) but still pass logic verification. Process variations that cause the superconducting electronic circuit design to fail logic verification may be ignored. The system then simulates the superconducting electronic circuit design using the selected process variation and different design variations. The system may then select the design variation that performs the best. Design variations that cause the superconducting electronic circuit design to fail logic verification may be ignored. The system may repeat this process (e.g., simulate the superconducting electronic circuit design using the selected design variation and different process variations and select the process variation that performs the worst, and so on). At the end of the process, the system may update the superconducting electronic circuit design using a process variation and design variation selected at the end of the process.

In certain embodiments, the system presents several technical advantages. For example, the system may reliably determine adjustments that improve the performance or yield of a superconducting electronic circuit design. As another example, the system may produce a superconducting electronic circuit design that has optimized performance metrics and mitigated susceptibility to variation. In some embodiments, the system uses fewer computing resources to produce a superconducting electronic circuit design. For example, the system may consider the impact of fewer combinations of process variations and design variations on the performance of the superconducting electronic circuit design before determining the superconducting electronic circuit design, which reduces processor and memory usage during the design process.

Although the system is described as applying a design technique to superconducting electronic circuit designs, it is understood that the system may apply the design technique to any suitable electronic circuit design. For example, the system may be used to update a complementary metal-oxide semiconductor (CMOS) device.

FIG. 1 illustrates an example system 100. As seen in FIG. 1, the system 100 includes one or more devices 104, a network 106, and a design device 108. Generally, the system 100 adjusts a superconducting electronic circuit design by simulating the superconducting electronic circuit design using different process variations and design variations.

A user 102 may use the device 104 to interact with and control other components of the system 100. For example, the user 102 may use the device 104 to issue instructions to the design device 108. Additionally, the user 102 may use the device 104 to provide a superconducting electronic circuit design to the design device 108. The device 104 is any suitable device for communicating with components of the system 100 over the network 106. As an example and not by way of limitation, the device 104 may be a computer, a laptop, a wireless or cellular telephone, an electronic notebook, a personal digital assistant, a tablet, or any other device capable of receiving, processing, storing, or communicating information with other components of the system 100. The network 106 is any suitable network operable to facilitate communication between the components of the system 100.

Figure 7:
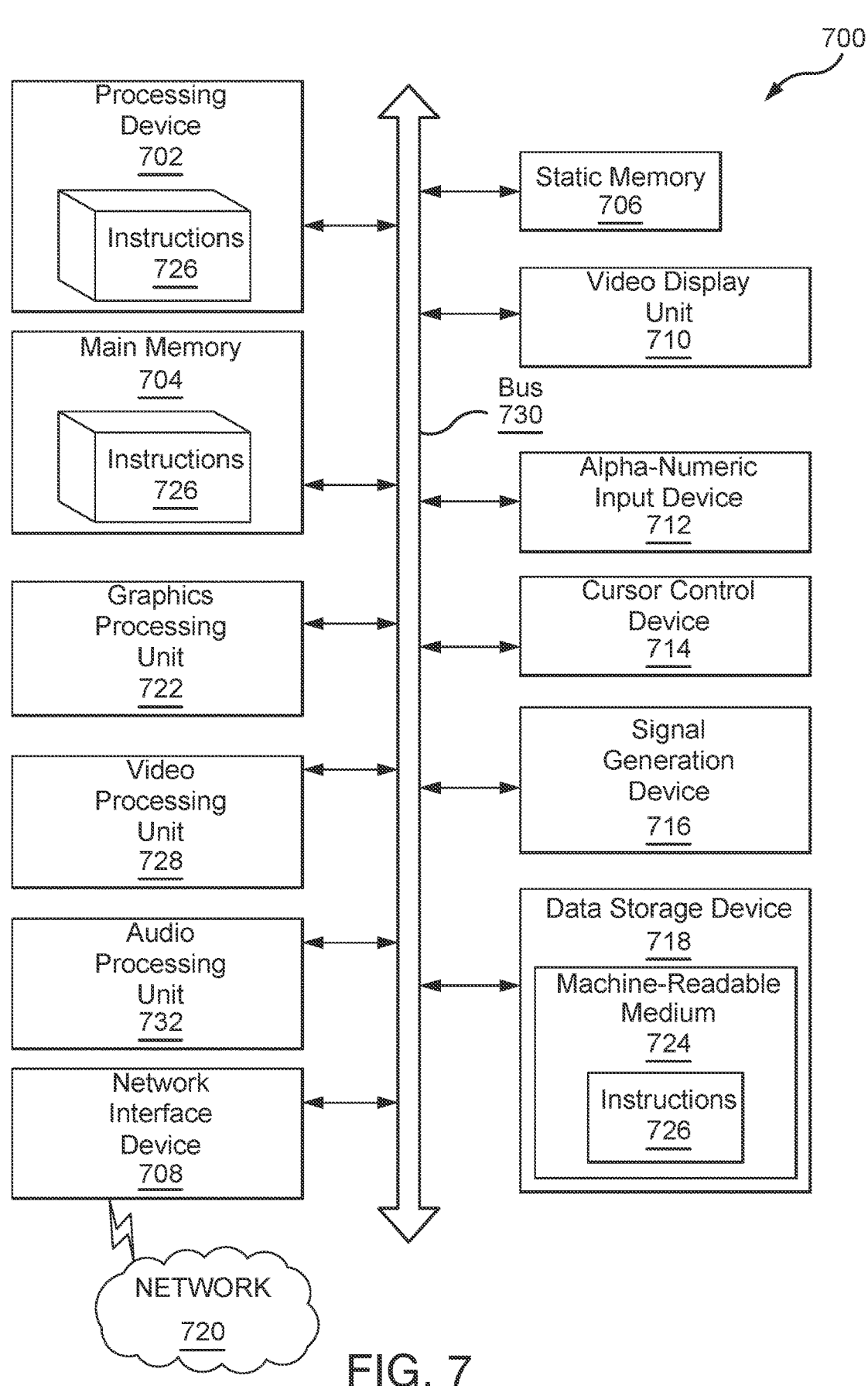
FIG. 7 depicts a diagram of an example computer system in which embodiments of the present disclosure may operate.

The design device 108 may be a computer system (e.g., the computer system 700 shown in FIG. 7). The design device 108 simulates a superconducting electronic circuit design and adjusts the superconducting electronic circuit design. Generally, in a first phase of the simulation process, the design device 108 may simulate the superconducting electronic circuit design using different process variations. The design device 108 may then select the process variation that performs the worst. In a second phase of the simulation process, the design device 108 may simulate the superconducting electronic circuit design using the selected worst-case process variation context while exploring different design variations. The design device 108 may then select the design variation that performs the best. The design device 108 may then return to the first phase and simulate the superconducting electronic circuit design using the selected design variation and different process variations. The design device 108 may then select the process variation that performs the worst and perform the second phase. This simulation process may repeat until the performance of the superconducting electronic circuit design converges or until the design device 108 repeats the simulation process a threshold number of times. The design device 108 may then update the superconducting electronic circuit design according to the latest selected process variation and design variation. As seen in FIG. 1, the design device 108 includes a processor 110 and a memory 112, which perform the actions or functions of the design device 108 described herein. The processor 110 and the memory 112 may be the processing device 702 and the memory 704 of the computer system 700 shown in FIG. 7.

The design device 108 receives a superconducting electronic circuit design 114. In some embodiments, the design device 108 may receive the superconducting electronic circuit design 114 from the device 104. The superconducting electronic circuit design 114 may include a superconducting electronic circuit or a superconducting electronic circuit component. The superconducting electronic circuit or the superconducting electronic circuit component may include a superconducting material (e.g., niobium) that conducts electricity with zero resistance. The superconducting electronic circuit design 114 be part of a quantum device or a quantum computer. For example, the superconducting electronic circuit design 114 may include Josephson junctions, adiabatic quantum flux parametron (AQFP) logic, rapid single flux quantum (RSFQ) logic, energy-efficient rapid single flux quantum (ERSFQ) logic, or reciprocal quantum logic (RQL).

The design device 108 may simulate the superconducting electronic circuit design 114 to determine adjustments that may improve the performance or yield of the superconducting electronic circuit design 114. The design device 108 begins in a first phase by simulating the superconducting electronic circuit design 114 using different process variations 116. Each process variation 116 may include a different change or variation to a process used to produce or manufacture the superconducting electronic circuit design 114. For example, each process variation 116 may result in the layers of the superconducting electronic circuit design 114 having different thicknesses or other geometric or material variation tolerances. The process variations 116 may include fluctuations in manufacturing dimensions, material purity, operating temperature, biasing, and sources of noise injection (e.g., thermal noise from components, electromagnetic radiation, mechanical vibrations, etc.). In the example of FIG. 1, the design device 108 simulates the superconducting electronic circuit design 114 using the process variations 116A, 116B, and 116C. For example, the design device 108 may simulate the superconducting electronic circuit design 114 using the process variation 116A. The design device 108 may then simulate the superconducting electronic circuit design 114 using the process variation 116B. The design device 108 may then simulate the superconducting electronic circuit design 114 using the process variation 116C.

The design device 108 may score each of the simulations using the different process variations 116. The design device 108 may determine a function that produces a score 118 based on different performance characteristics of the simulation of the superconducting electronic circuit design 114. The function may assign weights to different performance characteristics (e.g., power usage, delay, and area). The function may then combine these weighted characteristics to produce the score 118. As an example, the design device 108 may simulate the superconducting electronic circuit design 114 using a process variation 116. The design device 108 may evaluate the power usage, delay, and area of the superconducting electronic circuit design 114 under the process variation 116. The design device 108 may then apply the weights in the function to the power usage, delay, area, or other figure-of-merit, and the design device 108 may combine these weighted characteristics to produce the score 118 for that process variation 116. In the example of FIG. 1, the design device 108 produces the scores 118A, 118B, and 118C for the simulations under the process variations 116A, 116B, and 116C, respectively.

The design device 108 may determine the process variation 116 that caused the superconducting electronic circuit design 114 to perform the worst. The design device 108 may evaluate the scores 118 and select the process variation 116 that produced the lowest score 118. For example, the lowest score 118 may indicate that the process variation 116 produced the worst performing or least desirable combination of power usage, delay, and area for the superconducting electronic circuit design 114. The design device 108 may use the selected process variation 116 in the subsequent phase of simulations.

After selecting the process variation 116 that performed the worst, the design device 108 begins a second phase and simulates the superconducting electronic circuit design 114 using the selected process variation and different design variations 120. The design device 108 may set the selected process variation for the superconducting electronic circuit design 114. The design device 108 may then simulate the superconducting electronic circuit design 114 using different design variations 120. Each design variation 120 may include a change or variation for a design characteristic of the superconducting electronic circuit design 114. The design variations 120 may include changes to the size of components in the superconducting electronic circuit design 114, changes to the bias structures or currents in the superconducting electronic circuit design 114, changes to an external shunt resistor in the superconducting electronic circuit design 114, or changes to a storage inductor in the superconducting electronic circuit design 114.

The design device 108 may simulate the superconducting electronic circuit design 114 using the selected process variation and the different design variations 120. For example, the design variations 120 may include one or more of a change to the sizes of components in the superconducting electronic circuit design 114, a change to bias structures or currents in the superconducting electronic circuit design 114, a change to an external shunt resistor in the superconducting electronic circuit design 114, and a change to a storage inductor in the superconducting electronic circuit design 114. The design variations 120 may include changes to the diameter of a Josephson junction (as to change the critical current value), or the size or value of various components such as resistors, inductors, resonators, and passive transmission lines. In the example of FIG. 1, the design device 108 simulates the superconducting electronic circuit design 114 using the selected process variation 116 and the design variations 120A, 120B, and 120C. For example, the design device 108 may simulate the superconducting electronic circuit design 114 using the selected process variation 116 and the design variation 120A. The design device 108 may then simulate the superconducting electronic circuit design 114 using the selected process variation 116 and the design variation 120B. The design device 108 may then simulate the superconducting electronic circuit design 114 using the selected process variation 116 and the design variation 120C. By simulating the superconducting electronic circuit design 114 using the process variation 116 that performed the worst and using the different design variations 120, the design device 108 may determine how the superconducting electronic circuit design performs with different design variations 120 at a worst case process corner.

The design device 108 may score each simulation of the superconducting electronic circuit design 114. The design device 108 may use a function that produces a score 122 based on the performance of the superconducting electronic circuit design 114 in the simulation. The design device 108 may use the same or a similar function that was used to produce the scores 118 in the first phase of simulations (but the function may be in the relative context of the new functional design-range). For example, the function used in the second phase of simulations may consider the same objectives (e.g., power usage, delay, and area of the superconducting electronic circuit design 114) or different objectives. The function may use the same or different weights from the function used in the first phase of simulations. In the example of FIG. 1, the design device 108 produces the scores 122A, 122B, and 122C for the simulations using the different design variations 120A, 120B, and 120C, respectively.

After the design device 108 completes the second round of simulations, the design device 108 may select the design variation 120 that performed the best. For example, the design device 108 may select the design variation 120 that produced the highest score 122. In this manner, the design device 108 determines the design variation 120 that produced the best performance under the worst process corner.

After selecting the design variation 120 that performed the best, the design device 108 may repeat the first and second phases of simulation. The design device 108 may return to the first phase to simulate the superconducting electronic circuit design 114 using the selected design variation 120 and different process variations 116 to determine new scores 118, where the relative sensitivities to process variation may differ in this new design context. The design device 108 may select the process variation 116 that produced the worst performance or the lowest score 118. The design device 108 may then simulate the superconducting electronic circuit design 114 using the selected process variation 116 and different design variations 120 to produce new scores 122. The design device 108 may then select the design variation 120 that produced the best performance or the highest score 122. This process may repeat or continue until the design device 108 simulates the superconducting electronic circuit design 114 a threshold number of times or until the performance of the superconducting electronic circuit design 114 converges or stops changing significantly between rounds of simulations (e.g., the scores 118 and 122 do not change beyond a threshold amount between rounds of simulations).

In certain embodiments, the design device 108 may select multiple process variations 116 or design variations 120 during the first and second phases of simulation. For example, during the first phase of simulation, the design device 108 may select multiple process variations 116 that performed the worst (e.g., the two or three worst performing process variations 116). The design device 108 may then simulate the superconducting electronic circuit design 114 using the various selected process variations and different design variations 120 in parallel. For example, the design device 108 may simulate the superconducting electronic circuit design 114 using one of the worst performing process variations 116 and the different design variations 120 in parallel with simulating the superconducting electronic circuit design 114 using another one of the worst performing process variations 116 and the different design variations 120.

As another example, during the second phase, the design device 108 may select multiple design variations 120 that performed the best (e.g., the two or three best performing design variations 120). The design device 108 may then simulate the superconducting electronic circuit design 114 using the selected design variations 120 and the different process variations 116 in parallel. For example, the design device 108 may simulate the superconducting electronic circuit design 114 using one of the selected design variations 120 and the different process variations 116 in parallel with simulating the superconducting electronic circuit design 114 using another one of the selected design variations 120 and the different process variations 116. In this manner, the design device 108 may test the performance of the superconducting electronic circuit design 114 under multiple process variations 116 or multiple design variations 120.

After simulating the superconducting electronic circuit design 114, the design device 108 may generate an update 124 to the superconducting electronic circuit design 114. The update 124 may include the process variation 116 and the design variation 120 that were selected last during the rounds of simulation. The design device 108 may then adjust the superconducting electronic circuit design 114 according to the process variation 116 and the design variation 120 used to generate the update 124. For example, the design device 108 may set the process variation 116 and the design variation 120 for the superconducting electronic circuit design 114. These adjustments to the superconducting electronic circuit design 114 may improve the performance or yield of the superconducting electronic circuit design 114, in certain embodiments.

Figure 2:
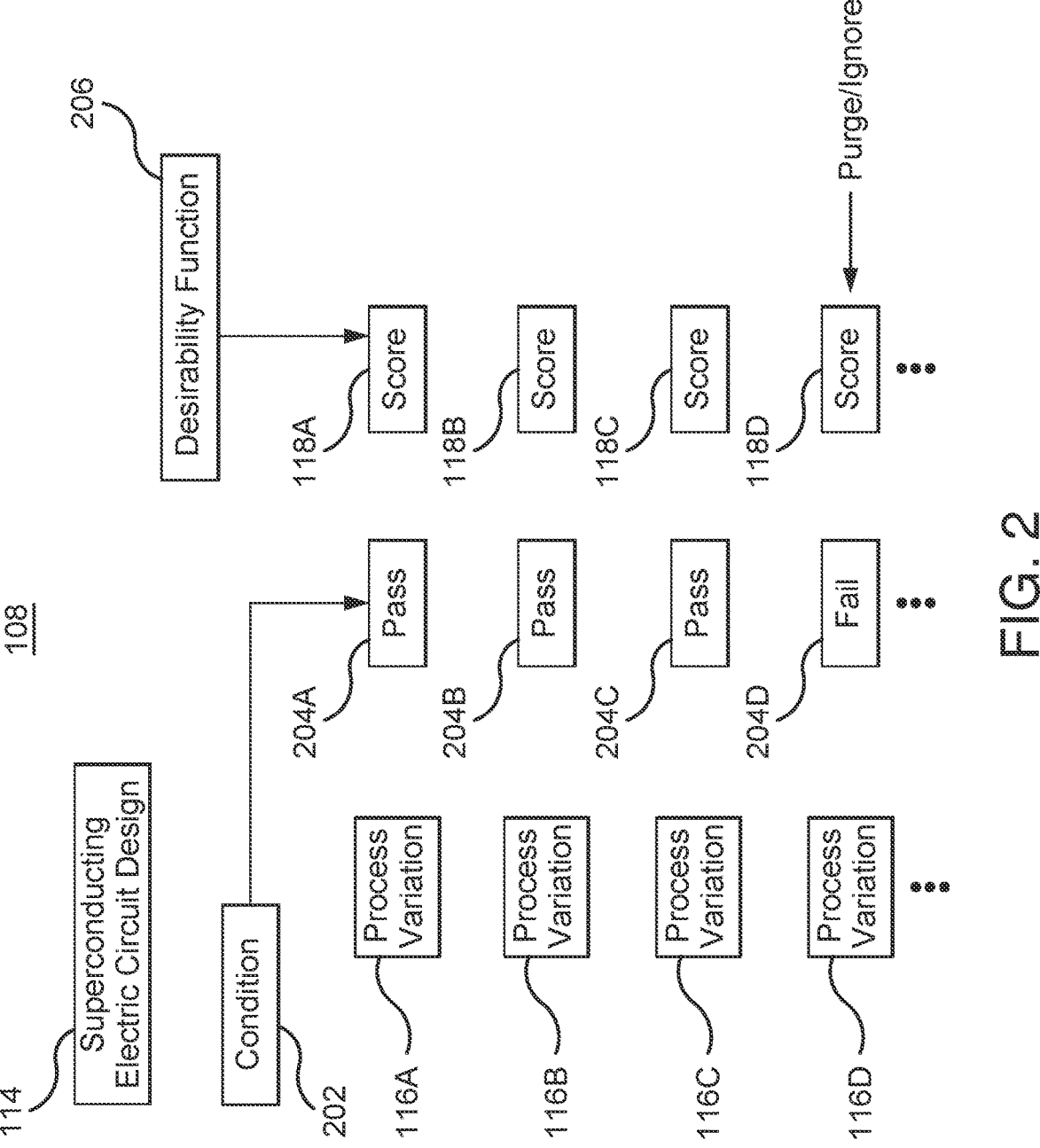
FIG. 2 illustrates an example design device in the system of FIG. 1 simulating a superconducting electronic circuit design using different process variations.

FIG. 2 illustrates an example design device 108 in the system 100 of FIG. 1. Generally, FIG. 2 shows the design device 108 performing a first phase of simulations using different process variations 116. As discussed previously, the design device 108 receives the superconducting electronic circuit design 114. The superconducting electronic circuit design 114 may include a superconducting electronic circuit or a superconducting electronic circuit component. The superconducting electronic circuit or the superconducting electronic circuit component may include a superconducting material (e.g., niobium) that conducts electricity with zero resistance or expels magnetic flux when cooled below a critical temperature. The superconducting electronic circuit design 114 may be part of a quantum device or a quantum computer. For example, the superconducting electronic circuit design 114 may include Josephson junctions, AQFP logic, RSFQ logic, ERSFQ logic, or RQL.

The design device 108 may receive or determine a condition 202 that establishes whether the superconducting electronic circuit design 114 passes logic verification (which may be determined through a Monte Carlo simulation). For example, the condition 202 may include a set of inputs and a set of expected outputs or expected intermediate signal values. When the set of inputs are provided to the superconducting electronic circuit design 114, if the superconducting electronic circuit design 114 produces the expected outputs or the expected intermediate signal values, then the superconducting electronic circuit design 114 passes logic verification. If the superconducting electronic circuit design 114 does not produce the expected outputs or the expected intermediate signal values, then the superconducting electronic circuit design 114 fails logic verification.

The design device 108 may simulate the superconducting electronic circuit design 114 using different process variations 116. In the example of FIG. 2, the design device 108 simulates the superconducting electronic circuit design 114 using the process variations 116A, 116B, 116C, and 116D. The process variations 116 may include changes or variations to processes used to produce or manufacture the superconducting electronic circuit design 114. For example, each process variation 116 may affect the thickness of layers in the manufacturing and processing steps of superconducting electronic circuit design 114 fabrication. The process variations 116 may include fluctuations in manufacturing dimensions, material purity, operating temperature, biasing, and sources of noise injection (e.g., thermal noise from components, electromagnetic radiation, mechanical vibrations, etc.). In some embodiments, the variations 116 may include changes or variations to biases or temperatures used when producing or manufacturing the superconducting electronic circuit design 114.

During each simulation, the design device 108 may determine whether the superconducting electronic circuit design 114 passes logic verification according to the condition 202. For example, the design device 108 may simulate the superconducting electronic circuit design 114 using the different process variations 116 and determine whether each simulation passes logic verification. In the example of FIG. 2, the design device 108 determines results 204 to the logic verification for each of the process variations 116. For example, the design device 108 may determine that the results 204A, 204B, and 204C for the process variations 116A, 116B, and 116C indicate that the simulations using the process variations 116A, 116B, and 116C pass logic verification. The design device 108 may determine that the result 204D for the process variation 116D indicates that the simulation using the process variation 116D fails logic verification. Because the simulation using the process variation 116D fails logic verification, the design device 108 may purge or ignore the simulation results for the process variation 116D.

During each simulation, the design device 108 may apply a desirability function 206 to the simulation results to produce a score 118 for the simulation. The desirability function 206 may consider multiple objectives (e.g., power usage, delay, and area of the superconducting electronic circuit design 114). The desirability function 206 may assign a weight to each of these objectives and then combine these weighted objectives to produce the score 118. Thus, the desirability function 206 evaluates how desirable a process variation 116 is based on the effect that that process variation 116 has on the objectives. For example a desirability function 206 may include the objective of minimizing delay with a weight of 10, power usage with a weight of 7, and area with a weight of 5. The design device 108 may multiply the delay determined through the simulation by 10, multiply the power usage determined through the simulation by 7, multiply the area determined through the simulation by 5, and sum those products to produce the score 118 for the simulation. In the example of FIG. 2, the design device 108 produces the scores 118A, 118B, 118C, and 118D for the process variations 116A, 116B, 116C, and 116D, respectively. Because the process variation 116D causes the superconducting electronic circuit design 114 to fail logic verification, the design device 108 may purge or ignore the score 118D.

The design device 108 may then determine the process variation 116 that passed logic verification and that performed the worst or produced the lowest score 118. Because the process variation 116D caused the superconducting electronic circuit design 114 to fail logic verification, the design device 108 may not consider the process variation 116D or the score 118D when evaluating the performance of the process variations 116. Using the previous example of the desirability function 206, the design device 108 may compare the scores 118 for each simulation produced by summing the products of the delay, power usage, and area with their corresponding weights. Specifically, because the desirability function 206 had the objective of minimizing the weighted delay, power usage, and area, the design device 108 may determine the score 118 (or the scores 118) that was the lowest. The design device 108 may purge or ignore the scores 118 or the simulations that passed logic verification. The design device 108 may then select the process variation 116 (or process variations 116) that produced the lowest score 118.

After selecting the process variation 116 that performed the worst or produced the lowest score 118, the design device 108 may proceed to the next phase of simulations. In some embodiments, the design device 108 may select multiple process variations 116 that perform the worst or produce the lowest scores, and proceed to the next phase of simulations using these process variations 116 in parallel.

Figure 3:
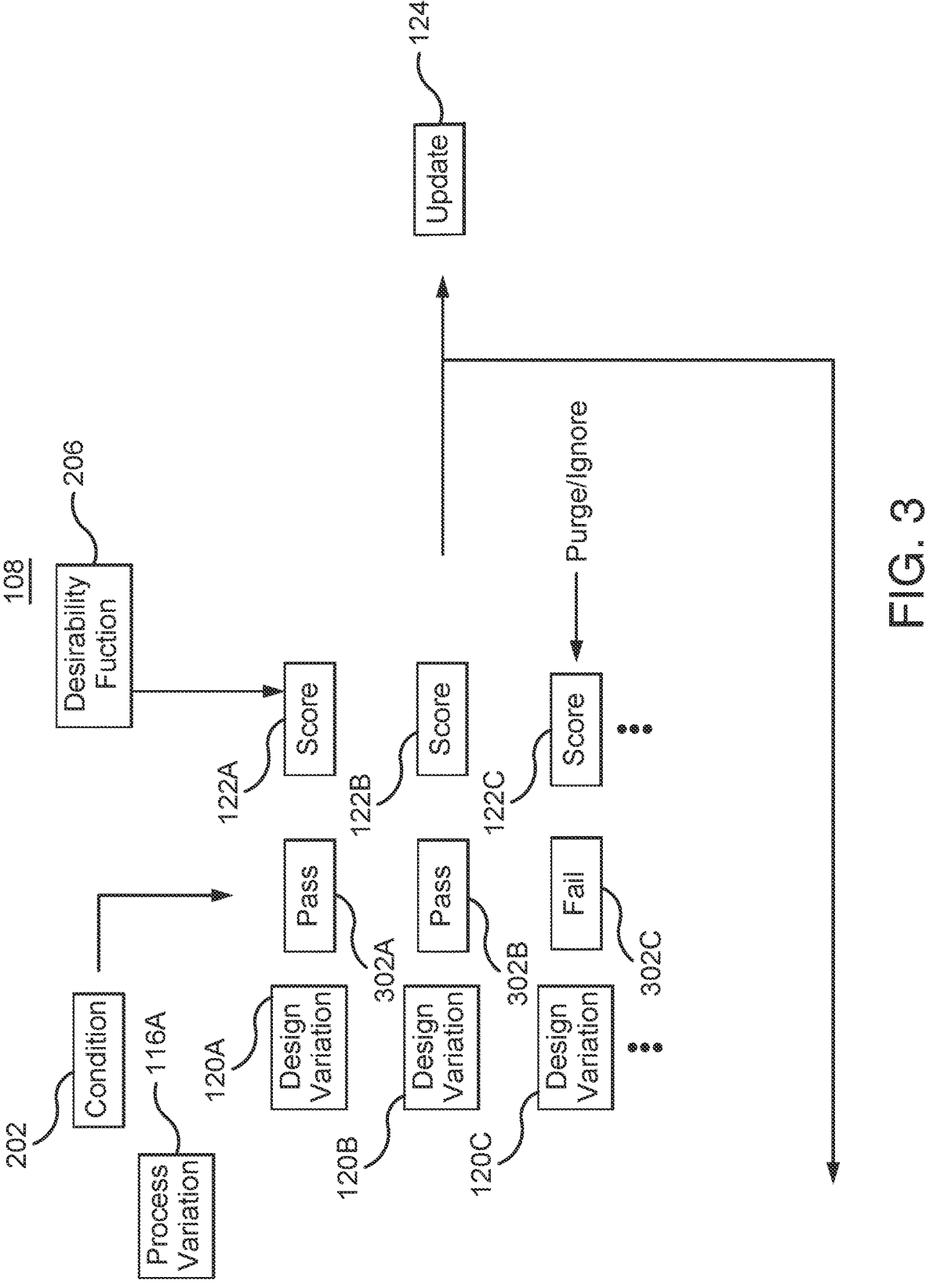
FIG. 3 illustrates an example design device in the system of FIG. 1 simulating a superconducting electronic circuit design using different design variations.

FIG. 3 illustrates an example design device 108 in the system 100 of FIG. 1. Generally, FIG. 3 shows the design device 108 performing a second phase of simulating a superconducting electronic circuit design 114 using different design variations 120. The design device 108 may perform the simulations after selecting the process variation 116 that performed the worst or produced the lowest score 118. In the example of FIG. 3, the design device 108 selected the process variation 116A during the first phase.

The design device 108 may set the condition 202 that indicates whether the superconducting electronic circuit design 114 passes logic verification. During this round of simulations, the design device 108 may use the same condition 202 as in the first phase of simulations, or the design device 108 may change or adjust the condition 202. As discussed previously, the condition 202 may indicate a set of inputs and a set of expected outputs or expected intermediate signal values. When the set of inputs is provided to the superconducting electronic circuit design 114, if the superconducting electronic circuit design 114 produces the expected outputs or the intermediate signal values, then the superconducting electronic circuit design 114 is considered to pass logic verification.

The design device 108 simulates the superconducting electronic circuit design 114 using the process variation 116A and the different design variations 120. The design variations 120 may include changes to the size of design dimensions such as the diameter of a Josephson junction (as to change the critical current value), or the size or value of various components such as resistors, inductors, resonators, and passive transmission lines. In the example of FIG. 3, the design device 108 simulates the superconducting electronic circuit design 114 using the process variation 116A and the design variations 120A, 120B, and 120C. During each simulation, the design device 108 may determine whether the superconducting electronic circuit design 114 with the process variation 116A and the design variation 120 passes logic verification according to the condition 202. In the example of FIG. 3, the design device 108 determines the results 302A, 302B, and 302C for the design variations 120A, 120B, and 120C, respectively. The results 302A and 302B may indicate that the design variations 120A and 120B caused the superconducting electronic circuit design 114 to pass logic verification. The result 302C may indicate that the design variation 120C causes the superconducting electronic circuit design 114 to fail logic verification.

The design device 108 may also apply the desirability function 206 to score the simulations. The desirability function 206 used in the second phase of simulations may be the same desirability function 206 used during the first phase of simulations. Alternatively, the desirability function 206 may consider different objectives and/or may apply different weights to the objectives considered during the first phase of simulations. In the example of FIG. 3, the design device 108 applies the desirability function 206 to produce the scores 122A, 122B, and 122C for the design variations 120A, 120B, and 120C, respectively.

After the simulations are complete, the design device 108 may select the design variation 120 that performed the best or that produced the highest score 122. Because the design variation 120C caused the superconducting electronic circuit design 114 to fail logic verification, the design device 108 may purge or ignore the design variation 120C and the score 122C when selecting the best performing design variation 120. By selecting the design variation 120 that performed the best or that produced the highest score 122, the design device 108 selects the design variation 120 that had the best performance under the worst process corner (e.g., the process corner formed using the process variation 116A).

The design device 108 may then return to the first phase of simulations using the selected design variation 120. The design device 108 may repeat the first phase of simulation and select the process variation 116 that performed the worst using the selected design variation 120. The design device 108 may then perform the second phase of simulations with the selected process variation 116 and select the best performing design variation 120. This process may repeat until the design device 108 has performed a threshold number of simulations or until the design device 108 determines that the performance of the superconducting electronic circuit design 114 has converged and/or does not change significantly (e.g., a threshold amount) across different rounds of simulation.

The design device 108 may then generate the update 124 for the superconducting electronic circuit design 114 using the latest selected process variation 116 and design variation 120. The update 124 may indicate the latest selected process variation 116 and design variation 120. The design device 108 may adjust the superconducting electronic circuit design 114 using the process variation 116 and design variation 120 indicated in the update 124. For example, the design device 108 may apply the update 124 by modifying the schematic or the layout of the superconducting electronic circuit design 114. These changes may improve the performance or yield of the superconducting electronic circuit design 114, in certain embodiments.

In certain embodiments, the design device 108 may perform a final set of simulations of the superconducting electronic circuit design 114 to determine the update 124. For example, the design device 108 may simulate the superconducting electronic circuit design 114 using the final selected design variation 120 (or multiple design variations 120 that performed the best) and different process variations 116. Through this final set of simulations, the design device 108 may determine the design variation 120 that results in the best performance or yield for the superconducting electronic circuit design 114. The design device 108 may then apply the update 124 to the superconducting electronic circuit design 114.

Figure 4:
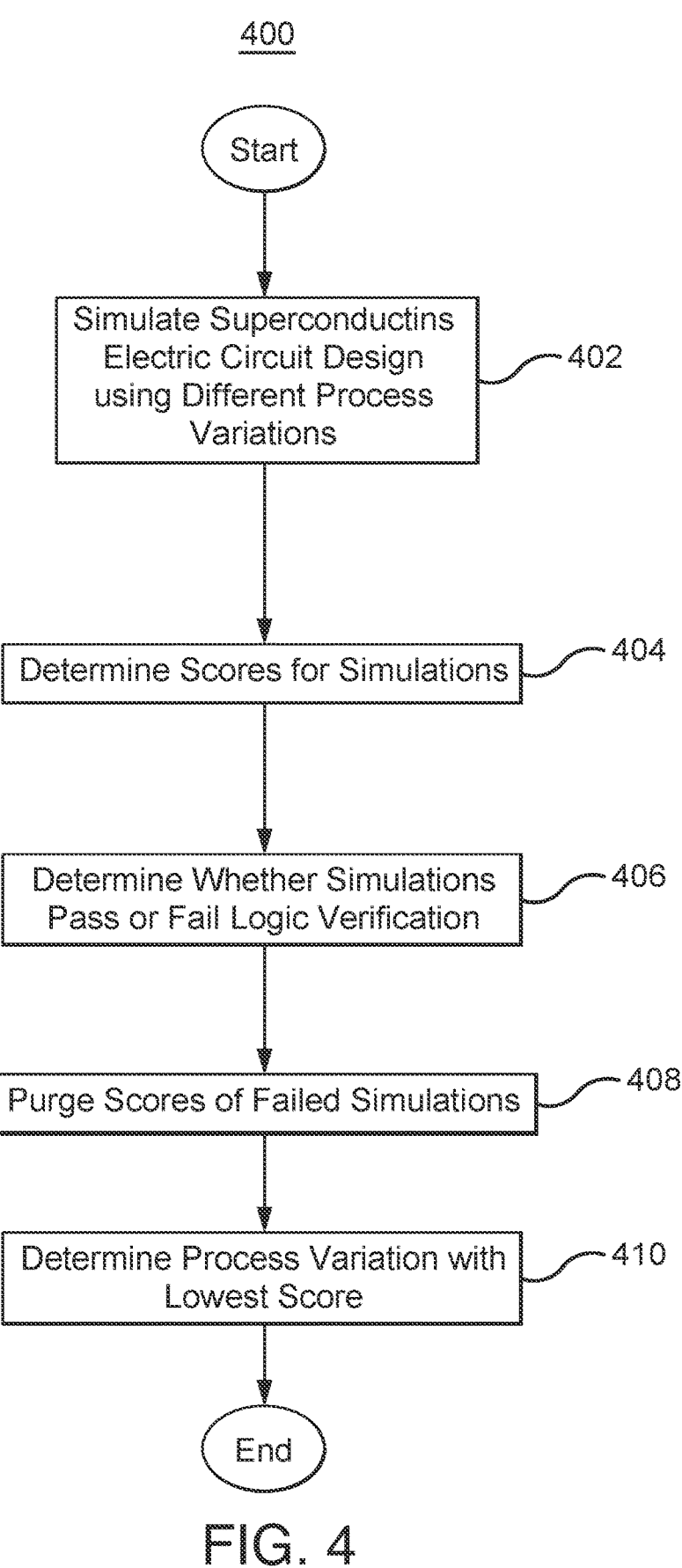
FIG. 4 is a flowchart of an example method performed in the system of FIG. 1.

FIG. 4 is a flowchart of an example method 400 performed in the system 100 of FIG. 1. In certain embodiments, the design device 108 performs the method 400. By performing the method 400, the design device 108 performs a first phase of simulation and determines a process variation 116 that causes a worst performance for a superconducting electronic circuit design 114.

At 402, the design device 108 simulates the superconducting electronic circuit design 114 using different process variations 116. The process variations 116 may affect a process used to produce or manufacture the superconducting electronic circuit design 114. The variations 116 may include changes or variations in process, bias, or temperature. The variation 116 may affect the thickness of a layer in the superconducting electronic circuit design 114. The process variations 116 may include fluctuations in manufacturing dimensions, material purity, operating temperature, biasing, and sources of noise injection (e.g., thermal noise from components, electromagnetic radiation, mechanical vibrations, etc.). The design device 108 may perform a simulation for each process variation 116. For example, the design device 108 may simulate the superconducting electronic circuit design 114 using a process variation 116A, and then the design device 108 may simulate the superconducting electronic circuit design 114 using a process variation 116B.

At 404, the design device 108 determines scores 118 for the simulations. The design device 108 may apply a desirability function 206 to determine the scores 118. The desirability function 206 may consider various objectives (e.g., power usage, delay, and area) when determining the score 118. For example, the desirability function 206 may apply different weights to the different objectives and then combine or sum the weighted objectives to produce the score 118.

At 406, the design device 108 determines whether the simulations pass or fail logic verification. The design device 108 may receive or determine a condition 202 that indicates whether the superconducting electronic circuit design 114 passes or fails logic verification. For example, the condition 202 may indicate a set of inputs and a set of expected outputs or expected intermediate signal values. When the set of inputs are provided to the superconducting electronic circuit design 114, if the superconducting electronic circuit design 114 produces the set of expected outputs or the set of intermediate signal values, then the superconducting electronic circuit design 114 passes logic verification. Otherwise, the superconducting electronic circuit design 114 fails logic verification. During each simulation, the design device 108 may apply the condition 202 to determine whether the superconducting electronic circuit design 114 passes or fails logic verification.

At 408, the design device 108 purges or ignores the scores 118 of the simulations that failed logic verification. For example, if a process variation 116 caused the superconducting electronic circuit design 114 to fail logic verification, then the design device 108 may ignore or purge the score 118 for that process variation 116. In some embodiments, the design device 108 does not calculate the scores 118 for the simulations that failed logic verification, which further reduces processor and memory usage.

At 410, the design device 108 determines the process variation 116 with the worst performance or the lowest score 118 out of the process variations 116 that caused the superconducting electronic circuit design 114 to pass logic verification. The process variation 116 with the worst performance may form a process corner at which the superconducting electronic circuit design 114 passes logic verification but has the worst performance. In some embodiments, the design device 108 determines or selects multiple process variations 116 with the worst performance or lowest scores 118. The design device 108 may then proceed with these selected process variations 116 in the next phase of simulations in parallel.

Figure 5:
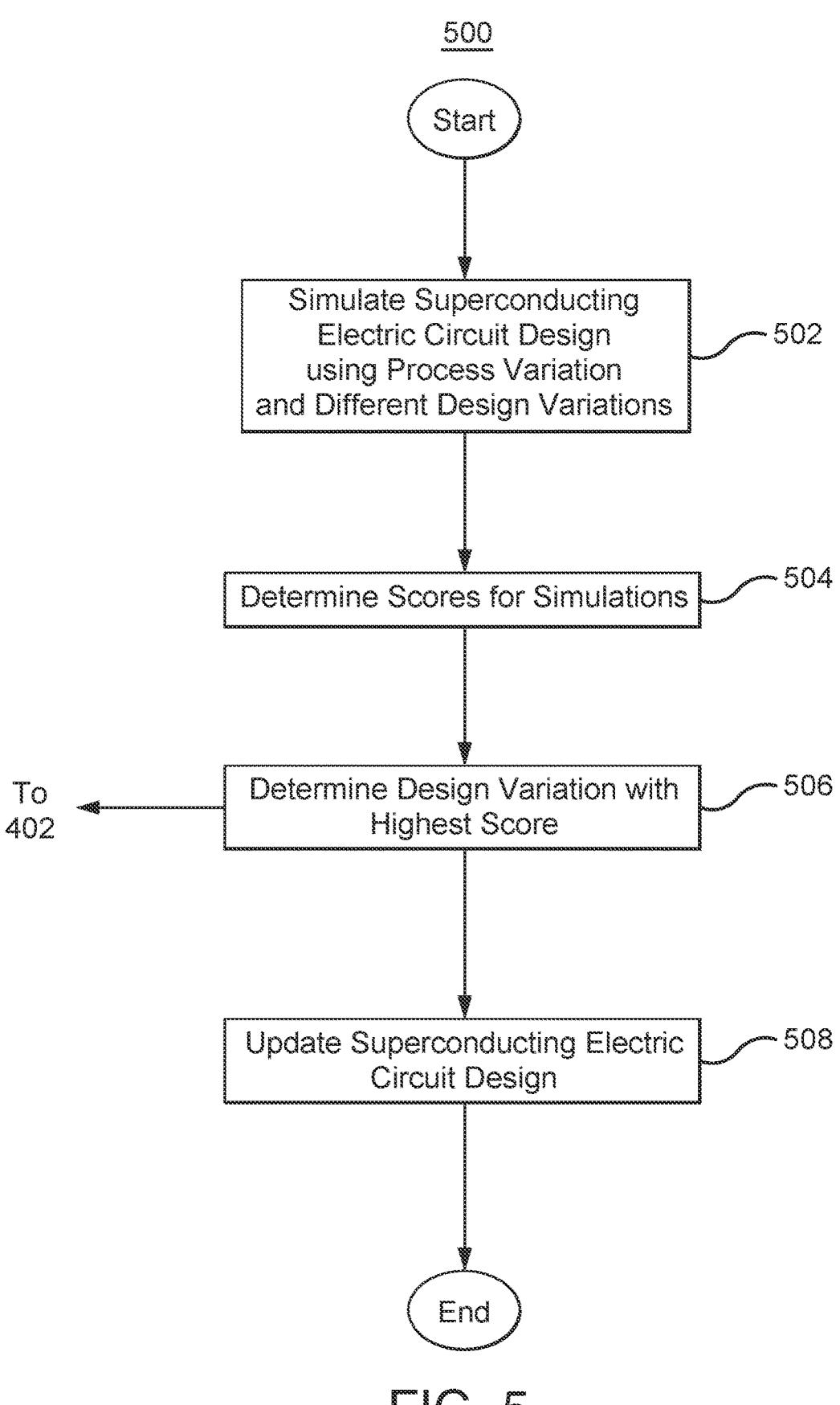
FIG. 5 is a flowchart of an example method performed in the system of FIG. 1.

FIG. 5 is a flowchart of an example method 500 performed in the system 100 of FIG. 1. In particular embodiments, the design device 108 performs the method 500. Generally, the method 500 may be performed after the method 400. By performing the method 500, the design device 108 performs a second phase of simulations and determines a design variation 120 that causes the superconducting electronic circuit design 114 to have a best performance under the process variation 116 selected in the method 400.

At 502, the design device 108 simulates the superconducting electronic circuit design 114 using the process variation 116 selected in the method 400 and different design variations 120. The design variations 120 may include changes or variations to different design aspects in the superconducting electronic circuit design 114. For example, the design variations 120 may include changes or variations to the size of the superconducting electronic circuit design 114, bias structures or currents in the superconducting electronic circuit design 114, an external shunt resistor for the superconducting electronic circuit design 114, or a storage inductor for the superconducting electronic circuit design 114. The design variations 120 may include changes to the diameter of a Josephson junction (as to change the critical current value), or the size or value of various components such as resistors, inductors, resonators, and passive transmission lines. The design device 108 may simulate the superconducting electronic circuit design 114 using the selected process variation 116 and each of the design variations 120. For example, the design device 108 may simulate the superconducting electronic circuit design 114 for a process variation 116A and a design variation 120A. The design device 108 may then simulate the superconducting electronic circuit design 114 for the process variation 116A and a designed variation 120B.

At 504, the design device 108 determines scores 122 for the simulations. The design device 108 may apply the same or a different desirability function 206 from the desirability function 206 used in the method 400. The desirability function 206 may consider multiple objectives (e.g., power usage, delay, and area) of the superconducting electronic circuit design 114. The desirability function 206 may apply weights to the different objectives, and combine the weighted objectives to produce the score 122.

In some embodiments, the design device 108 purges or ignores the scores 122 and the design variations 120 that cause the superconducting electronic circuit design 114 to fail logic verification. As with the method 400, the design device 108 may determine whether each simulation of the superconducting electronic circuit design 114 passes or fails logic verification according to a condition 202. If a design variation 120 causes the superconducting electronic circuit design 114 to fail logic verification, the design device 108 may ignore or purge the score 122 and the design variation 120.

At 506, the design device 108 determines the design variation 120 with the best performance or the highest score 122 out of the design variations 120 that passed logic verification. This design variation 120 may be the design variation 120 that causes the superconducting electronic circuit design 114 to have the best performance under the worst process variation 116. The design device 108 may then determine whether to repeat the simulations performed for the method 400. If the design device 108 has not performed a threshold number of simulations or if the design device 108 determines that the performance of the superconducting electronic circuit design 114 has not converged, then the design device 108 may return to 402. The design device 108 may determine whether the performance of the superconducting electronic circuit design 114 has converged by determining whether the scores 118 or 122 have changed substantially across rounds of simulations. At 402, the design device 108 may simulate the superconducting electronic circuit design 114 using the selected design variation 120 and different process variations 116.

If the design device 108 determines that additional simulations should not be performed, then the design device 108 may proceed to 508. At 508, the design device 108 updates the superconducting electronic circuit design 114. The design device 108 may determine an update 124 using the latest selected process variation 116 from the method 400 and the latest selected design variation 120 from the method 500. The update 124 may include the selected process variation 116 and the selected design variation 120. The design device 108 may adjust the superconducting electronic circuit design 114 using the selected process variation 116 and the selected design variation 120. For example, the design device 108 may adjust the schematic or the layout of the superconducting electronic circuit design 114. In this manner, the design device 108 may improve the performance or yield of the superconducting electronic circuit design 114.

Figure 6:
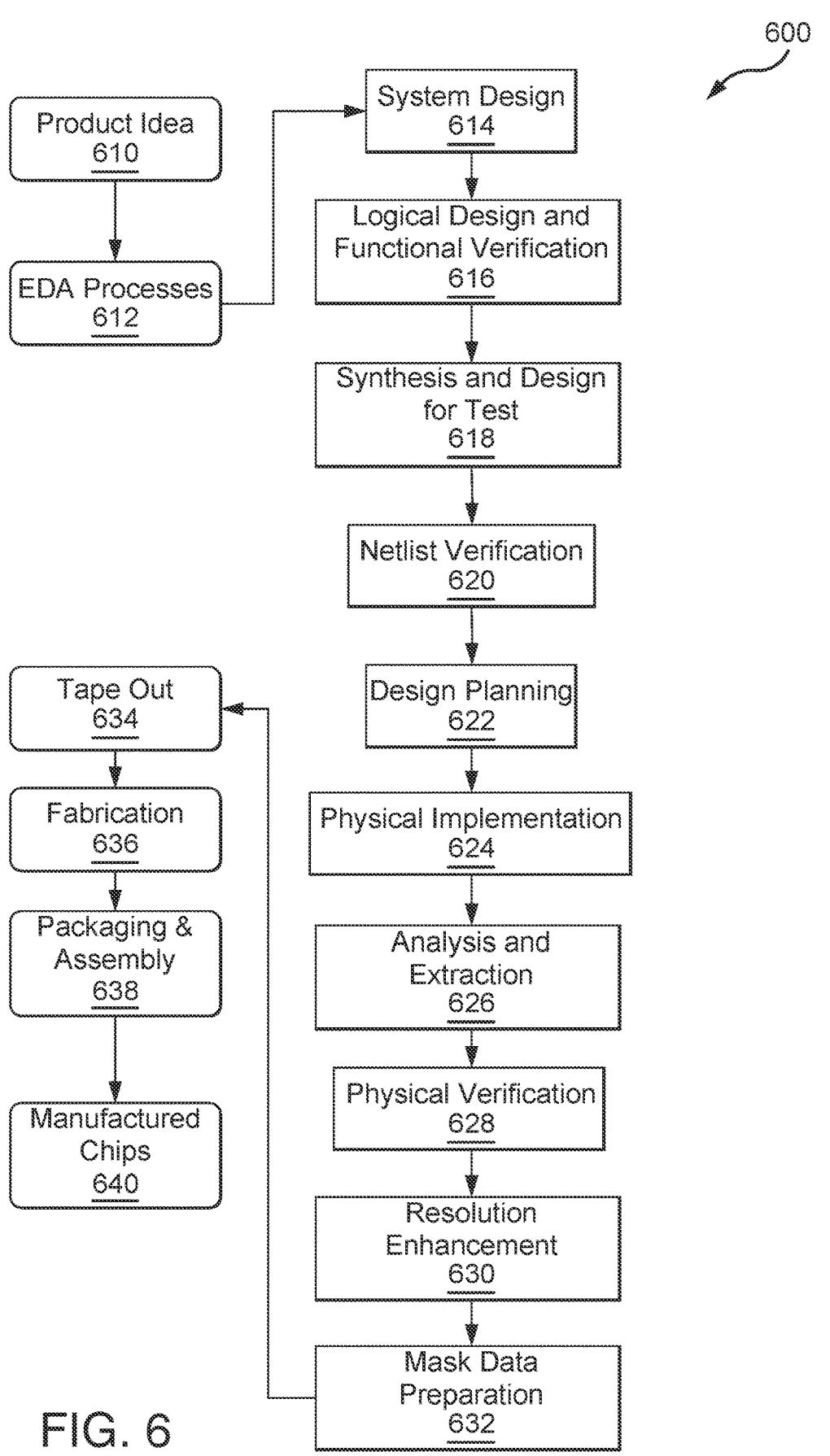
FIG. 6 depicts a flowchart of various processes used during the design and manufacture of an integrated circuit in accordance with some embodiments of the present disclosure.

FIG. 6 illustrates an example set of processes 600 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 610 with information supplied by a designer, information which is transformed to create an article of manufacture that uses a set of EDA processes 612. When the design is finalized, the design is taped-out 634, which is when artwork (e.g., geometric patterns) for the integrated circuit is sent to a fabrication facility to manufacture the mask set, which is then used to manufacture the integrated circuit. After tape-out, a semiconductor die is fabricated 636 and packaging and assembly processes 638 are performed to produce the finished integrated circuit 640.

Specifications for a circuit or electronic structure may range from low-level transistor material layouts to high-level description languages. A high-level of representation may be used to design circuits and systems, using a hardware description language ('HDL') such as VHDL, Verilog, System Verilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding systems of that layer (e.g., a formal verification system). A design process may use a sequence depicted in FIG. 6. The processes described by be enabled by EDA products (or EDA systems).

During system design 614, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 616, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 618, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 620, the netlist is checked for compliance with timing constraints and for correspondence with the HDL code. During design planning 622, an overall floor plan for the integrated circuit is constructed and analyzed for timing and top-level routing.

During layout or physical implementation 624, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 626, the circuit function is verified at the layout level, which permits refinement of the layout design. During physical verification 628, the layout design is checked to ensure that manufacturing constraints are correct, such as DRC constraints, electrical constraints, lithographic constraints, and that circuitry function matches the HDL design specification. During resolution enhancement 630, the geometry of the layout is transformed to improve how the circuit design is manufactured.

During tape-out, data is created to be used (after lithographic enhancements are applied if appropriate) for production of lithography masks. During mask data preparation 632, the 'tape-out' data is used to produce lithography masks that are used to produce finished integrated circuits.

A storage subsystem of a computer system (such as computer system 700 of FIG. 7) may be used to store the programs and data structures that are used by some or all of the EDA products described herein, and products used for development of cells for the library and for physical and logical design that use the library.

FIG. 7 illustrates an example machine of a computer system 700 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM), a static memory 706 (e.g., flash memory, static random access memory (SRAM), etc.), and a data storage device 718, which communicate with each other via a bus 730.

Processing device 702 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 may be configured to execute instructions 726 for performing the operations and steps described herein.

The computer system 700 may further include a network interface device 708 to communicate over the network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), a graphics processing unit 722, a signal generation device 716 (e.g., a speaker), graphics processing unit 722, video processing unit 728, and audio processing unit 732.

The data storage device 718 may include a machine-readable storage medium 724 (also known as a non-transitory computer-readable medium) on which is stored one or more sets of instructions 726 or software embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media.

In some implementations, the instructions 726 include instructions to implement functionality corresponding to the present disclosure. While the machine-readable storage medium 724 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 702 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electronical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A system for generating a superconducting electronic circuit design, the system comprising:

a memory; and a processor communicatively coupled to the memory, the processor configured to:

simulate a superconducting electronic circuit design using a first process variation to produce a first score for the superconducting electronic circuit design;

after simulating the superconducting circuit design using the first process variation, simulate the superconducting electronic circuit design using a second process variation to produce a second score for the superconducting electronic circuit design;

determine that the first score is lower than the second score;

in response to determining that the first score is lower than the second score:

simulate the superconducting electronic circuit design using the first process variation and a first design variation to produce a third score for the superconducting electronic circuit design; and after simulating the superconducting circuit design using the first process variation and the first design variation, simulate the superconducting electronic circuit design using the first process variation and a second design variation to produce a fourth score for the superconducting electronic circuit design; and determine that the third score is higher than the fourth score;

update the superconducting electronic circuit design using the first process variation and the first design variation in response to determining that the third score is higher than the fourth score; and simulate the superconducting electronic circuit design using the first design variation and a third process variation to produce a fifth score for the superconducting electronic circuit design.

2. The system of claim 1, wherein the processor is further configured to:

determine a condition that establishes whether the superconducting electronic circuit design passes or fails logic verification;

simulate the superconducting electronic circuit design using a fourth process variation to produce a sixth score; and in response to the determining that the superconducting electronic circuit design with the fourth process variation fails logic verification according to the condition, purge the sixth score.

3. The system of claim 1, wherein the first score is determined according to a desirability function based on one or more of delay, power, and area.

4. The system of claim 1, wherein the first design variation is one or more of a size variation, a bias structure variation, a bias current variation, an external shunt resistor variation, and a storage inductor variation.

5. The system of claim 1, wherein updating the superconducting electronic circuit design using the first design variation is further based on the fifth score.

6. The system of claim 1, wherein the first process variation affects a thickness of a layer of the superconducting electronic circuit design.

7. A method for generating a superconducting electronic circuit design, the method comprising:

simulating a superconducting electronic circuit design using a first process variation to produce a first score for the superconducting electronic circuit design;

after simulating the superconducting circuit design using the first process variation, simulating the superconducting electronic circuit design using a second process variation to produce a second score for the superconducting electronic circuit design;

determining, by a processor, that the first score is lower than the second score;

in response to determining that the first score is lower than the second score:

simulating the superconducting electronic circuit design using the first process variation and a first design variation to produce a third score for the superconducting electronic circuit design; and after simulating the superconducting circuit design using the first process variation and the first design variation, simulating the superconducting electronic circuit design using the first process variation and a second design variation to produce a fourth score for the superconducting electronic circuit design; and determining, by the processor, that the third score is higher than the fourth score;

updating the superconducting electronic circuit design using the first process variation and the first design variation in response to determining that the third score is higher than the fourth score; and simulating the superconducting electronic circuit design using the first design variation and a third process variation to produce a fifth score for the superconducting electronic circuit design.

8. The method of claim 7, further comprising:

determining a condition that establishes whether the superconducting electronic circuit design passes or fails logic verification;

simulating the superconducting electronic circuit design using a fourth process variation to produce a sixth score; and in response to the determining that the superconducting electronic circuit design with the fourth process variation fails logic verification according to the condition, purging the sixth score.

9. The method of claim 7, wherein the first score is determined according to a desirability function based on one or more of delay, power, and area.

10. The method of claim 7, wherein the first design variation is one or more of a size variation, a bias structure variation, a bias current variation, an external shunt resistor variation, and a storage inductor variation.

11. The method of claim 7, wherein updating the superconducting electronic circuit design using the first design variation is further based on the fifth score.

12. The method of claim 7, wherein the first process variation affects a thickness of a layer of the superconducting electronic circuit design.

13. A non-transitory computer readable medium storing instructions for generating a superconducting electronic circuit design, wherein when the instructions are executed by a processor, the processor:

simulates a superconducting electronic circuit design using a first plurality of process variations to produce a first set of scores for the superconducting electronic circuit design;

determines a process variation of the first plurality of process variations that produced a lowest score from the first set of scores;

in response to determining the process variation that produced the lowest score from the first set of scores, simulates the superconducting electronic circuit design using the determined process variation and a plurality of design variations to produce a second set of scores for the superconducting electronic circuit design;

determines the design variation of the plurality of design variations that produced a highest score from the second set of scores; and updates the superconducting electronic circuit design using the determined process variation and the determined design variation; and simulates the superconducting electronic circuit design using the determined design variation and a second plurality of process variations to produce a third set of scores for the superconducting electronic circuit design.

14. The medium of claim 13, wherein the processor further:

determines a condition that establishes whether the superconducting electronic circuit design passes or fails logic verification; and in response to determining that the superconducting electronic circuit design with a first process variation from the first plurality of process variations fails logic verification according to the condition, purges a score of the first set of scores produced by simulating the superconducting electronic circuit design with the first process variation.

15. The medium of claim 13, wherein the first set of scores is determined according to a desirability function based on one or more of delay, power, and area.

16. The medium of claim 13, wherein the plurality of design variations comprises one or more of a size variation, a bias structure variation, a bias current variation, an external shunt resistor variation, and a storage inductor variation.

17. The medium of claim 13, wherein updating the superconducting electronic circuit design using the determined design variation is further based on the third set of scores.

\* \* \* \* \*